United States Patent [19]

Rhodes

[11] 4,288,812

[45] Sep. 8, 1981

[54] COLOR FILTER

[75] Inventor: Roland N. Rhodes, Belle Mead, N.J.

[73] Assignee: RCA Corporation, New York, N.Y.

[21] Appl. No.: 94,286

[22] Filed: Nov. 19, 1979

[51] Int. Cl.³ .............................................. H04N 9/09
[52] U.S. Cl. ........................................ 358/44; 358/43
[58] Field of Search ...................... 358/41, 43, 44, 47, 358/48

[56] References Cited

U.S. PATENT DOCUMENTS

| | | |
|---|---|---|
| 3,982,274 | 9/1976 | Chai ..................................... 358/44 |
| 4,042,956 | 8/1977 | Yamanaka ............................ 358/44 |
| 4,064,532 | 12/1977 | Yamanaka ............................ 358/44 |
| 4,106,056 | 8/1978 | Nagumo ............................... 358/47 |
| 4,121,244 | 10/1978 | Nakabe ................................. 358/44 |
| 4,141,036 | 2/1979 | Diehl ..................................... 358/44 |
| 4,200,892 | 4/1980 | Weimer ................................. 358/44 |

Primary Examiner—Robert L. Richardson
Assistant Examiner—Michael Allen Masinick
Attorney, Agent, or Firm—P. J. Rasmussen; W. H. Meise; Henry I. Steckler

[57] ABSTRACT

A color filter for a single image pickup device camera features using color filter elements that have one dimension that is less than the corresponding dimension of photosensors in pickup device. This results in a wider bandwidth signal.

11 Claims, 9 Drawing Figures

COLOR FILTER

BACKGROUND OF THE INVENTION

The present invention relates to a color encoding filter, and more particularly, to a color encoding filter for use with a single image pickup device camera.

In recent years it has become practical to make a television camera pickup device using an array of photosensors, such as a charge coupled device arrangement, instead of the more conventional vidicon image pickup tubes. It is also known to make a color television camera that comprises only one such pickup device instead of the normal three, if a stripe color encoding filter is disposed in front to the pickup device. Such a filter may comprise alternate stripes of red, blue, and green filters, which are vertically aligned with the photosensors respectively, although other colors are known to be used. Such a filter when used with a solid state imaging photosensor array pickup device has problems, particularly, the luminance output signal has limited frequency response and beats and aliasing can occur. "Aliasing" in this context refers to spurious signals developed when a desired signal is processed through a sampling or modulating system.

It is therefore desirable to have a filter for use with a pickup device having a plurality of photosensors that permits a wide frequency response in the resulting luminance signal as well as lower beats and aliasing.

SUMMARY OF THE INVENTION

In brief, this is achieved by having a filter comprising areas of alternating colors. The areas have one dimension which is less than the corresponding dimension of the photosensor of the image pickup device.

DESCRIPTION OF THE DRAWINGS

FIG. 5 shows a filter in accordance with the present invention superimposed upon a photosensor array for providing interlaced signals; while

DETAILED DESCRIPTION OF THE INVENTION

Figure 1:
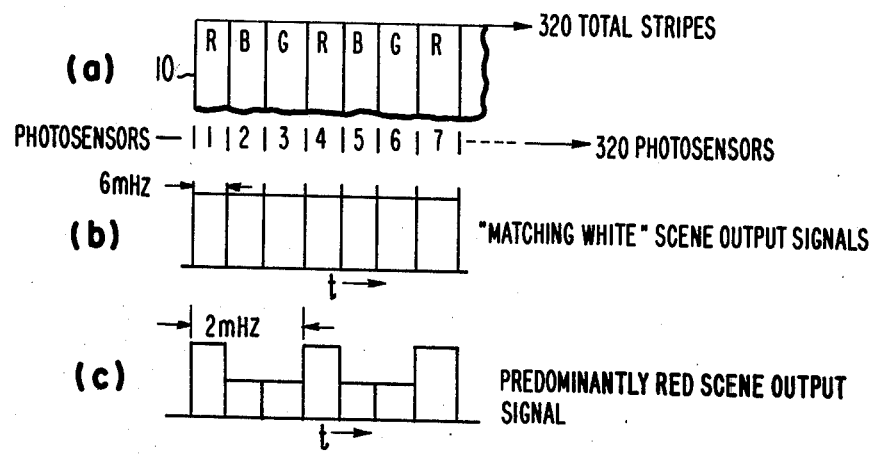
FIG. 1 shows a vertical stripe filter and its output signals under differing illumination conditions.

FIG. 1a shows a typical pattern of prior art vertical stripes 10, which are aligned vertically with the photosensing elements (resolution cells) 11 of a typical solid state pickup device (not shown). There are, for example, a total of 320 photosensors 11 and stripes 10 in each horizontal line. If the camera is viewing a purely white object, there will be some combinations of scene illumination, filter responses, and device responses that will cause the outputs from each photosensor 11 to be equal, as can be seen in FIG. 1b. With a typical number of 320 horizontal photosensitive elements per line which are scanned in 53 microseconds (in an NTSC system), there will therefore be under the above conditions of equal color signals, an output signal having a number of samples during one line scan which is equivalent to 320 divided by 53 which corresponds to about 6 MHz. The Nyquist limit is half this amount, or about 3 MHz, which, if it could be used, would indeed provide a 3 MHz resolution in a luminance signal derived from the photosensors 11. However, if the conditions specified above are not met in an area of the scene being picked up, e.g. there is more of one color than of the other two colors, or if there are more of two colors than the remaining color, the output signal of FIG. 1b will not be obtained. For example, if there is more of red than of green and blue, the pulse heights of the signal from the photosensitive elements behind the red color elements of the filter 10, will be greater than the other two. These red pulses repeat at a rate equivalent to $\frac{1}{3}$ of 6 MHz as shown in FIG. 1c for a predominantly red scene. Therefore, there will be a 2 MHz vertical pattern in the luminance output signal. This is an intolerable spurious effect, and therefore, the luminance signal must be passed through a low pass filter having a cutoff below 2 MHz, and the information available in the band from 2 to 3 MHz is not utilized, thereby losing $\frac{1}{3}$ of the resolution capability of the sensor chip.

Figure 2:
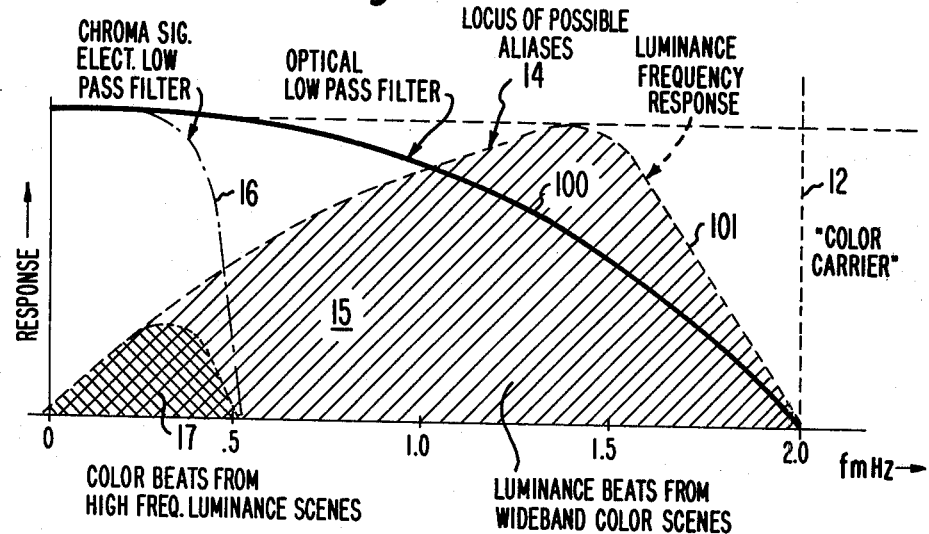
FIG. 2 shows the frequency spectrum output of a vertical stripe filter.

As is the case with all sampled systems, there are a number of scenes which cause beats or aliasing in most area shared color camera systems. FIG. 2 shows the principal carriers and beats generated by a vertical stripe RGB (red, green, blue) camera using 320 horizontal photosensor elements per line. Curve 100 shows the frequency response of an optical low pass filter which is used in the optical path in front of the color filter. Curve 101 shows the frequency response of the luminance channel. A signal at 2 MHz caused by the effect described above appears in the spectrum as shown by the line 12, and this signal in effect acts as a color "carrier" with the incoming colored light, so that the incoming light beats against it, causing the locus of possible aliases illustrated by the curve 14 to be present. It will be seen that beats occur in the luminance signal (shown by shaded area 15) due to the locus of possible aliases 14. Also shown by curve 16 is the chrominance signal after it is passed through an electrical low pass filter having a 0.5 MHz cut off frequency. It will be seen that the locus 14 can also beat with this chrominance signal in a chroma demodulator, causing beats as shown by shaded area 17.

Figure 3:
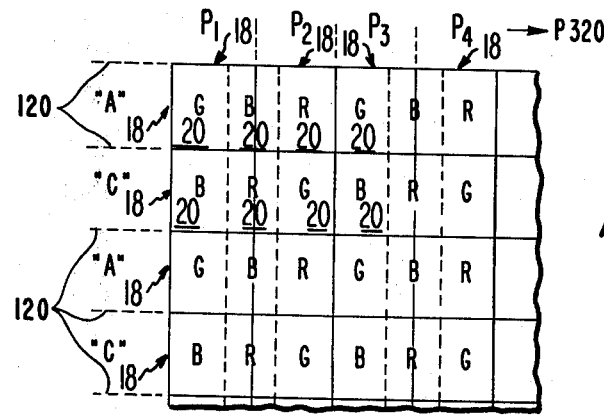
FIG. 3 shows a filter in accordance with the present invention for a non-interlaced system.

FIG. 3 shows, using solid lines, the outlines of the photosensitive elements 18 of a solid state imaging device. Elements 18 are square and measure about 30 microns on a side. The dotted lines show that color filter elements 20 (R, G, B, for red, blue, and green) are rectangular in nature. Elements 20 have the same height as that of the photosensor elements but only $\frac{2}{3}$ the width, that is they are 20 microns wide. Thus in the horizontal direction, three of the color elements 20 have the same width as two of the photosensitive elements 18. Every other line of color elements 20 is shifted by one color element, although shifts of greater or less than one element can be used. For example, the color elements between lines 120 can be shifted on alternate lines by less than the width of a color element. The result is that the electrical signal output from a given photosensor element is not simply that due to the color from the viewed scene being passed through a unique red, blue, or green color filter element, but a combination of them.

The contribution from each color is related to the proportion of the area of the photosensor element covered by each particular color. Thus the upper left-hand photosensor would have ⅔ green and ⅓ blue as its output signal, while the next photosensor to the right would have ⅓ blue and ⅔ red making up its output signal. Since it is desired to solve for the pure red, blue, and green signals, the output signals from sets of 3 photosensors would normally be sufficient to do this. However, the output signals from sets of four can be used, which simplifies decoding. The arrangement of FIG. 3 will also produce a "carrier" signal as does FIG. 1a, but it will be at 3 MHz. A filter is required to eliminate the carrier. Since this filter can be at 3 MHz rather than at 2 MHz as in the prior art, a fifty percent improvement in bandwidth and hence horizontal resolution is obtained.

Figure 4:
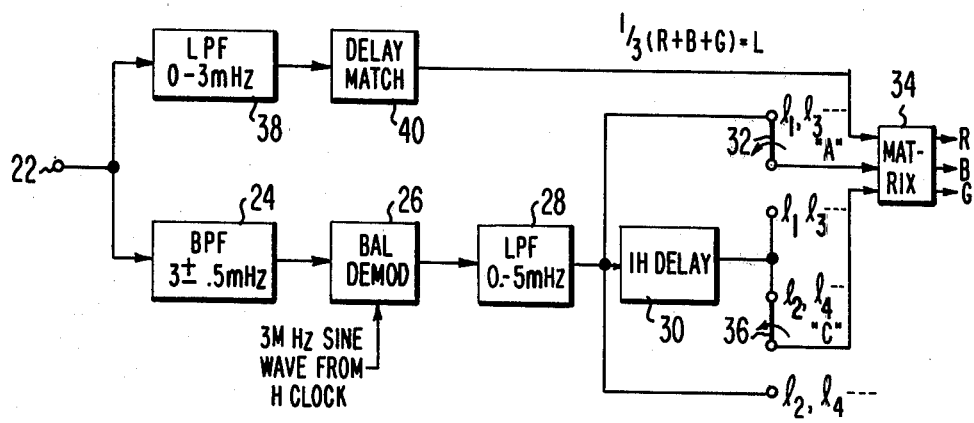
FIG. 4 shows a demodulator for use with the filter of FIG. 3.

FIG. 4 shows a decoder for use with the filter and solid state image of FIG. 3. The signal from the imager is applied to an input terminal 22. Part of the signal is applied to a bandpass filter 24, which has a center frequency of 3 MHz and a bandpass of ½ MHz on either side of this. The output signal from BPF 24 is applied to a balanced demodulator 26, which also receives a 3 MHz sine wave reference input signal. This signal is derived from the horizontal clock signal applied to the imager. The output of the balanced demodulator 26 is applied to a low pass filter 28 having ½ MHz cut off frequency. From there the signal is applied to a 1H (one horizontal line) delay line 30, which is needed since there are only two pieces of color information on any one line, and therefore, it is necessary to process two lines to obtain all the color information necessary to provide a full color output signal. A switch 32 is provided to alternately provide a delayed and undelayed signal called "A" to a matrix 34, while a switch 36 is provided to alternately provide a delayed and undelayed signal called "C" to matrix 34. These signals are derived from alternate horizontal lines of the photosensitive elements 18 as indicated in FIG. 3. Switches 32 and 34 are ganged, so it will be seen from FIG. 4, that when signal A comprises a delayed signal, signal C comprises an undelayed signal and vice versa. The input signal on terminal 22 is also applied through a 3 MHz low pass filter 38, and from there to a delay matching element 40, which provides a sufficient amount of delay to match the delay that the A and C signals have undergone in going through the circuits 24, 26, and 28. The output of delay matching element 40 is the luminance signal L comprising equal portions of red, blue, and green signals, i.e. L=⅓ (R+B+G), and it is applied to matrix 34. The amplitude of the 3 MHz color signal wave from BPF 24 on the odd number lines is A=⅓ (G−R), while on even number of lines it is C=⅓ (B−G). It can be shown that the matrix 34 therefore must solve the equations R=−2A−C+L, B=A+2C+L and G=A−C+L. Such a matrix can be easily designed.

Figure 5A:
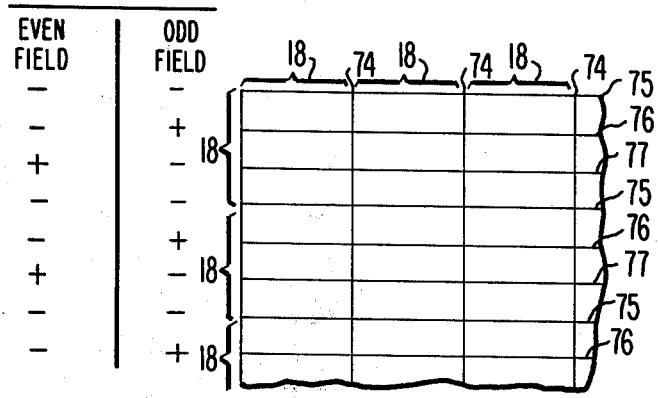
FIG. 5a shows some structure of a photosensor array.
Figure 5:
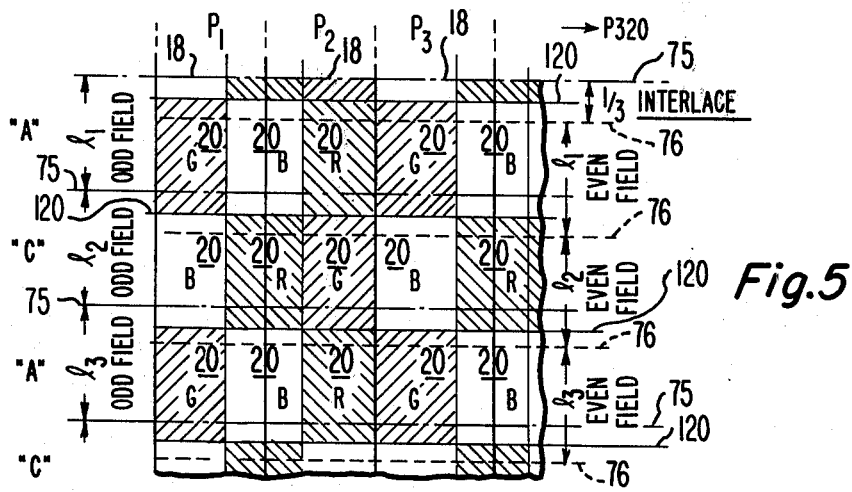

FIG. 5 shows a color filter pattern for use with an interlaced system. Before explaining it, it will first be necessary to explain that in a particular embodiment as shown in FIG. 5a, each of the photosensing elements 18 have channel stops 74 that define the horizontal widths of the photosensors 18. Further, each of the photosensors 18 have a vertical array of horizontally extending conductive stripes 75, 76, 77. During charge accumulation due to illumination during the odd field, voltages are applied to the horizontal stripes in sets of three, of which the outmost two 75 and 77 are slightly negative and the center one 76 is positive, all with respect to the substrate. This defines the vertical dimension of the photosensors 18. During the next field, the position of the positive voltage is shifted down by one or two lines, which changes the effective vertical position of the photosensor 18. This shifting provides the interlace. The output signals from the device are derived from a vertical shifting operation of the columns of photosensors into a shift register. Such a device is conventional and is known as a "three phase vertical transfer device". Turning now to FIG. 5, it will be seen that there is a vertical offset between the photosensitive elements 18 and the color filter elements 20, the filter being otherwise the same as shown in FIG. 3. In the particular embodiment shown, the offset is by 1/6 of the height of the photosensitive element, i.e. one stripe. The offset is symmetrically disposed about the horizontal lines 120 between the rows of the color filter elements 20, which is midway between sets of stripes 75 and 76. It will be noticed that due to the disposition of the color filter elements 20, when shifting down, whatever is lost by way of color information at the top of the elements 20 is picked up on the bottom side thereof, and therefore, the same circuit shown in FIG. 4 can be used for decoding the interlaced signals resulting from the embodiment shown in FIG. 5 as well as the non-interlaced signals resulting from the embodiment shown in FIG. 3. However, a different matrix is required. In particular due to the area of each color filter element over each photosensor, the matrix must solve the equations:

$$R = -(2\tfrac{1}{4})A - (\tfrac{3}{4})C + L,\ B = (\tfrac{3}{4})A + (2\tfrac{1}{4})C + L,\ G = (1\tfrac{1}{2})A - (1\tfrac{1}{2})C + L.$$

Figure 6:
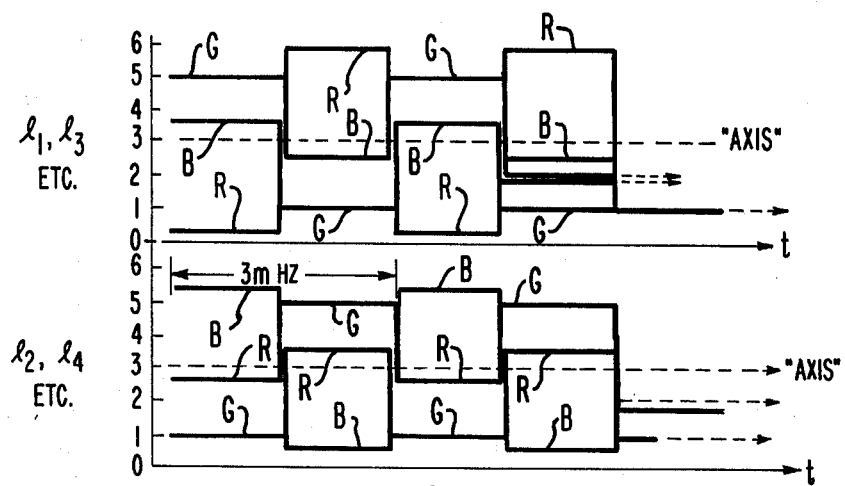
FIG. 6 shows waveforms obtained from the embodiment of FIG. 5.

FIG. 6 shows as superimposed the waveforms obtained individually at the output of the camera sensor device for the various color components when the imager views solid primary color fields one at a time. It is assumed that each photosensor element is divided into nine parts, and that each color contributes proportionate to the area of the corresponding color filter section to the whole photosensor area. It will be noted that with 320 photosensitive elements being scanned in 53 microseconds, the square waves shown repeat at a rate equivalent to 3 MHz. Consequently, the frequency response of the luminance signal channel must be limited to about 3 MHz to prevent the appearance of vertical stripes equivalent to 3 MHz from appearing in the picture. This compares favorably with the 2 MHz limit for the same imager using the RGB vertical stripe filter approach shown in FIG. 1. Further in four-color filter systems, as shown in FIG. 1B of U.S. Pat. No. 4,121,244, the red in the yellow color filter which comprises red plus green, may not be the same as the red in the pure red filter, and the blue in the cyan color filter which comprises blue plus green, may not be the same as in the pure blue filter. The result of this is either horizontal banding or color flicker depending upon how interlace is obtained. In the present invention, when viewing a green field, the bright and dark areas produced by the green and non-green (red and blue) filter areas respectively are 180° out of phase from line to line. When the green scene includes wideband frequency components, this phase alternation effect reduces visibility of beats from the green signal against the color "carrier" at 3 MHz.

Secondary colors such as yellow, cyan, and magenta, may be substituted for the red, blue, and green primary colors in the filter. This results in higher sensitivity at the expense of some additional required matrixing. Also a combination of primary and secondary colors such as yellow, green, and cyan may be used.

Figure 7:
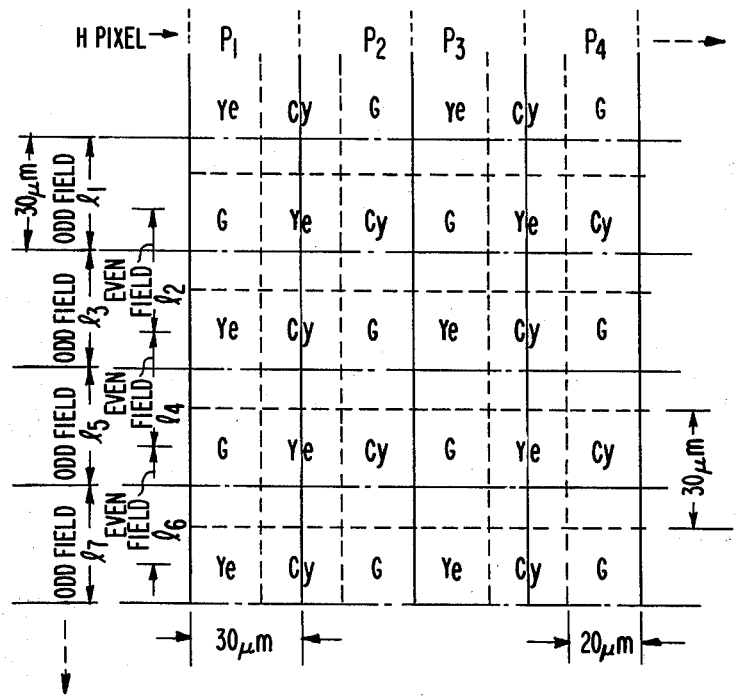
FIG. 7 shows an alternate embodiment.

This possibility is shown in FIG. 7 which shows a yellow, cyan, and green filter. This arrangement has certain advantages over that shown in FIG. 5 using red, blue, and green color elements. In particular, this color combination results in the green output signal having no 3 MHz "carrier" component, so it will provide the basis for a full resolution luminance signal having little or no beat problem in the high frequency green scenes. The overall luminance pickup which is $L = R + B + 3G$ is closer to the color composition of the NTSC constant luminance signal than the RGB approach where $L = R + B + G$. This may provide reduction in the visibility of noise according to well known constant luminance principles. It can also be shown that the use of secondary color filters will permit more scene light to pass, which will provide higher sensitivity. In addition to the L signal provided above, the A signal would equal $A = \frac{1}{3}(R - 2B)$ and the C signal would equal $\frac{1}{3}(2R - B)$. The matrix then would be designed to solve the equations $R = 2C - A$, $B = C - 2A$, and $G = L + A - C$.

Figure 8:
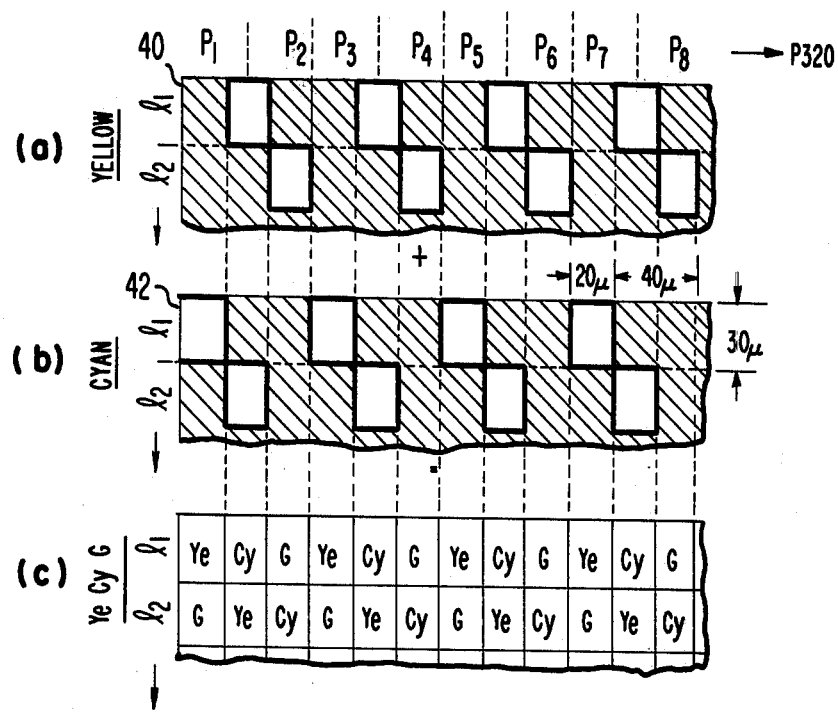
FIG. 8 shows a method of construction of FIG. 7.

FIG. 8 shows how a yellow, cyan, and green filter can be constructed out of just yellow and cyan filter sections 40 and 42 respectively, shown in FIGS. 8a and 8b respectively. Each of these filter sections 40 and 42 has just a colored area of the respective color shown by diagonal and a transparent or neutral density area shown without the shading. When the filters are overlapped, the results are color filter sections as shown in FIG. 8c. In particular, where there are yellow and cyan colors overlapped, the results are green colored filter areas.

What is claimed is:

1. A color filter for use with an image pickup device having a plurality of photosensors and a line scan direction, said filter comprising a plurality of horizontally repetitive sets of areas of different colors, all of the areas having a dimension in the direction of said line scan which is less than the corresponding dimension of the photosensors of said pickup device.

2. A filter as claimed in claim 1, wherein said areas are rectangular.

3. A filter as claimed in claim 1, wherein said colors comprise red, green, and blue.

4. A filter as claimed in claim 1, wherein said colors comprise yellow, cyan, and green.

5. A filter as claimed in claim 1, wherein said filter comprises two overlayed sections, each having areas of a single color alternating with neutral density areas, each section having filter areas of a different color from that of the other section and being staggered with respect thereto, whereby said filter has three different color areas due to overlap between said sections.

6. A filter as claimed in claim 1, wherein said one dimension is the horizontal dimension.

7. A filter as claimed in claim 1, wherein said dimension of the areas are two thirds the length of the corresponding dimension of the photosensors.

8. A filter as claimed in claim 1, wherein areas having a particular color are horizontally offset with respect to areas having the same particular color in vertically adjacent rows.

9. A filter as claimed in claim 1, further comprising the camera pickup device, said areas being mounted proximate the photosensors.

10. A device comprising a pickup device having a plurality of photosensors, and a color filter having a plurality of horizontally repetitive sets of areas of different colors, said areas being vertically offset with respect to said photosensors and having the same height as said photosensors.

11. A device comprising a pickup device having a plurality of photosensors read out with a one third of a photosensor height vertical offset between fields to achieve vertical interlace, and a color filter having a plurality of horizontally repetitive sets of areas of different colors, said areas being vertically offset with respect to said photosensors by one sixth of a photosensor height.

* * * * *